United States Patent Office 3,794,549
Patented Feb. 26, 1974

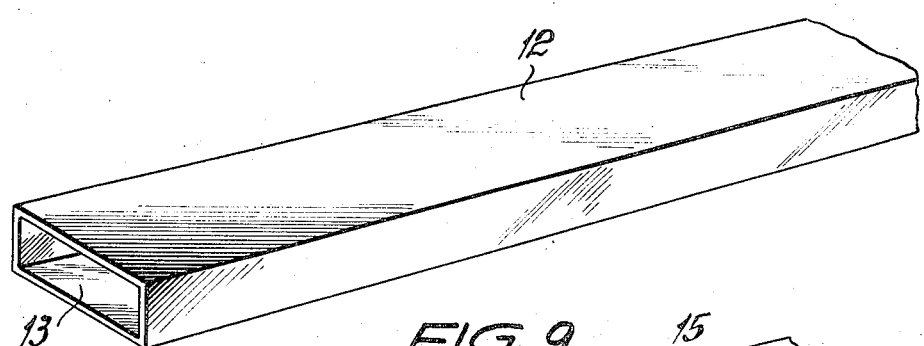
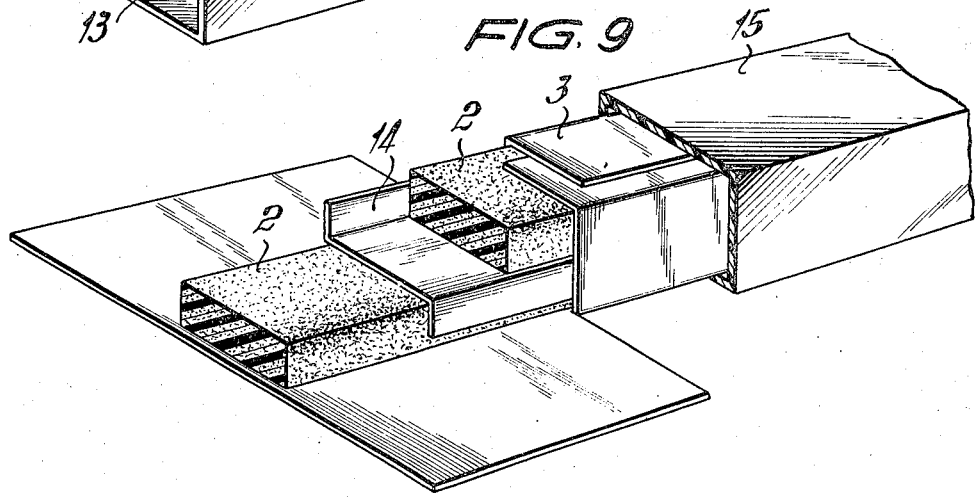
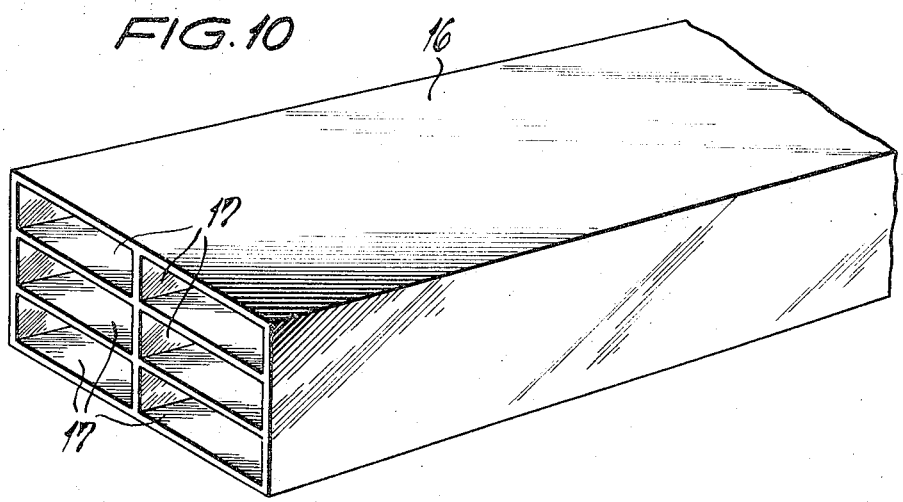

3,794,549
FOAM SEALING MATERIAL WITH
REMOVABLE WRAPPING
Georg Schroteler, Dusseldorf-Benrath, Germany, assignor to Firma Chemiefac GmbH, Dusseldorf-Reisholz, Germany
Filed Aug. 9, 1972, Ser. No. 279,226
Int. Cl. B32b 3/26, 5/18, 7/06
U.S. Cl. 161—43
10 Claims

ABSTRACT OF THE DISCLOSURE

A foam strip sealing material impregnated with an adhesive having long lasting plastic properties capable of retention of the foam strip material in a compressed state prior to its use in combination with a wrapping means removably surrounding the compressed foam strip material and which has a first layer of silicon paper having a silicon coating on both of its sides, a rigid outer cover of non-sticking synthetic material into which the foam strip with the silicon paper thereon is slidably and removably inserted.

FIELD OF THE INVENTION

The present invention relates to a wrapping material for removably wrapping a foam strip or string material has been impregnated with an adhesive means having a lasting plastic property and capable of preventing the elastic return or capable of delaying such elastic return of such strip material, such strip material being kept in a compressed state by the wrapping until the time of its use.

BACKGROUND OF THE INVENTION

Foam material strips or strings which have been impregnated by bitumen, was of synthetic materials have the property that after they have been compressed they retain their compressed state for some time, however, due to the imperfectness of the adhesive material used for the impregnation and due to the effect of the elastic forces operating within the foam material, they tend to return into their original state, that is, to expand.

Foam materials of this type are usually for the sealing of grooves, or joints, or hollow spaces such as in connection with the sealing of flanges in underground constructions.

Before insertion into the groove or seams, the impregnated foam material must be compressed according to the requirement of its later application to a fraction of its original volume. In this state it is placed or inserted into the groove or seam which is to be sealed where it will expand after a few minutes or after a longer time and will fill the hollow space which is to be filled under the effect of the elastic forces operating under pressure within the foam material. The compressing of the impregnated foam material is usually done by hand at the place of the construction or by using appropriate devices, such methods are usually found impractical and uneconomical.

It has been already proposed that the precompressed foam material strips or strings which have been impregnated should be covered or wrapped by a foil and after they have been inserted into the groove which is to be sealed, such wrapping should be opened up along the length thereof in order that the foam material will be given the opportunity to expand and press itself together with the wrapping against the body of the groove which is to be sealed. Such method has the disadvantage that the foil breaks the contact between the impregnated foam material and the body portion of the groove or joint so that there can be no adhesive effect taking place between the foam material and the body of the groove. The effect of the foil has also another disadvantage when the body of the groove or sides of the groove are uneven and rough since the sealing effect due to the presence of the remaining foil cannot be properly had.

It has been also proposed that the precompressed foam material strip should be wrapped by a strip material and pressed together between two rigid plates whereupon the strip or the plates are removed only directly before the processing of the sealing material.

It has been also proposed the insertion of the compressed foam strip into a gas-tight cover which is then subsequently evacuated. Not considering the cost and the difficulties of the production methods of this type of sealing strips, especially the provision of the color, the evacuation of the cover and its attended disadvantages, the gas-tight foil is especially sensitive and it can be easily damaged whereupon the evacuation, consequently, the retention of the pre-compressed state of the foam strip material becomes questionable.

SUMMARY OF THE INVENTION

It is, therefore, an object of the present invention to provide a wrapping for a foam strip material which has been precompressed and which makes the foam strip material capable to retain such precompressed state until it is being used and which wrapping is inexpensive and can be provided by unskilled labor and still provide a reliable protection for the precompressed foam strip or string material against damage.

According to the present invention the foam strip or string material is provided in its compressed state about its circumference with a non-adhesive covering or wrapping by a paper which on its both sides is provided with a silicon layer and with the wrapping on while the precompressed state is retained, it is placed between a pair of rigid thin plates which have a width of about the width of the foam material and which subsequently are provided with a wrapping fully or partially and which is glued together to form a tube-like body having a cross sectional area of the compressed foam material and from which the foam strip or string material wrapped into the silicon paper can be directly removed by sliding it out of the wrapping before its final use.

The tube-like body can be made in different ways, such as shown more specifically on the drawings and described subsequently. Also the foam strip material wrapped into the silicon paper can be placed into a tube which can be made as an integral piece having thin walls, from a synthetic material, such as hard PVC or polystyrol and made by an injection method.

DESCRIPTION OF THE DRAWINGS

The invention will become more readily apparent from the following description of preferred embodiments thereof shown in the accompanying drawings, in which:

FIGS. 1–10 show the various steps of the setting of the compressed foam material into its wrapping and into its hard outer cover.

DESCRIPTION OF THE PREFERRED EMBODIMENTS

Figure 1:
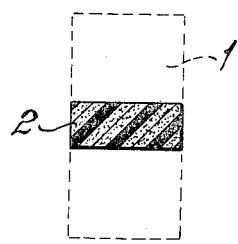
Figure 2:
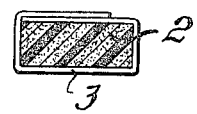

With reference to FIGS. 1 and 2, in FIG. 1 the foam strip material is illustrated in cross-section in its expanded state with the dashed line 1, while it is illustrated in cross-section in its compressed state 2. FIG. 2 illustrates the compressed foam strip material 2 after it has been wrapped with silicon paper 3.

Figure 3:
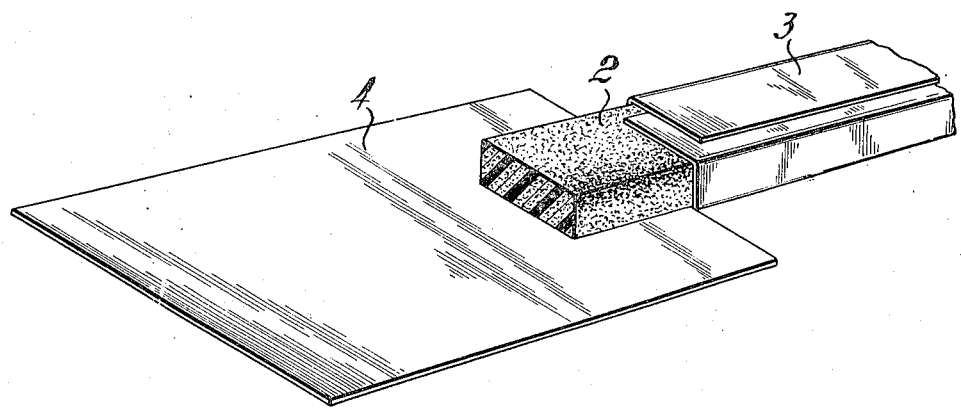

FIG. 3 illustrates the compressed strip 2 with its silicon paper wrapping 3 where the silicon paper which extends beyond the compressed strip 2 is cut up and spread out into a flat portion 4 which serves then as a gripping part and for easy handling of the sealing material during mounting and removal of the paper 3.

Figure 4:
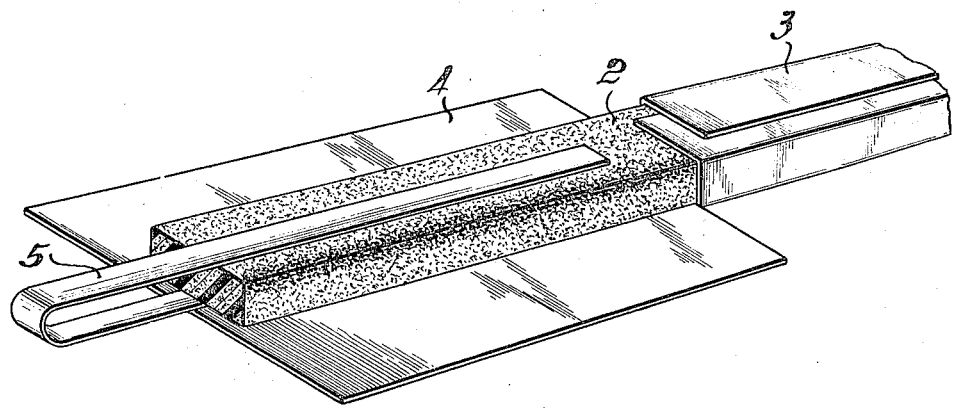

FIG. 4 illustrates a similar situation as FIG. 3, namely, with the end of the silicon strip 2 exposed and instead of using the silicon paper 3 as the gripping portion, an additional gripping loop 5 is attached to the compressed strip material 2 as a gripping portion.

Figure 5:
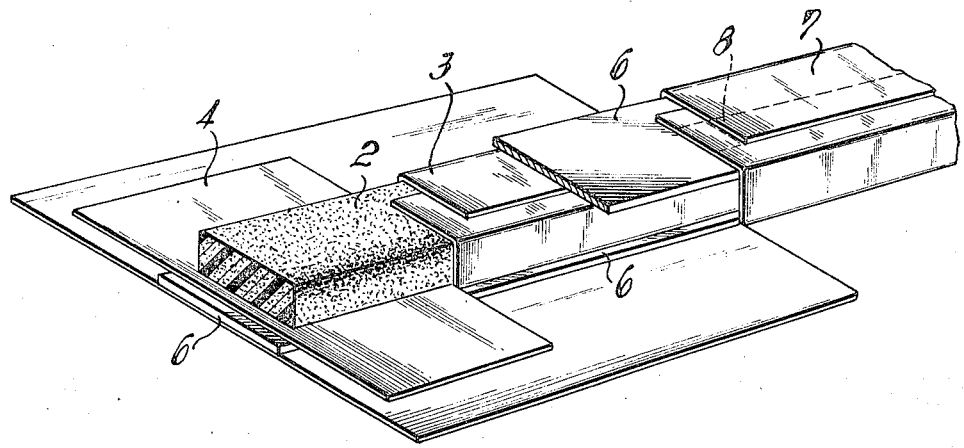

With reference to FIG. 5 it is seen that the foam strip material 2 after having been wrapped with silicon paper 3 is placed between a pair of rigid plates 6 placed on its top end bottom and becomes wrapped into a paper 7 which is then glued together along portion 8 whereupon a tube-like body is created from which the foam wrapped into the silicon paper 3 can be removed by sliding it out of the tube-like body.

Figure 6:
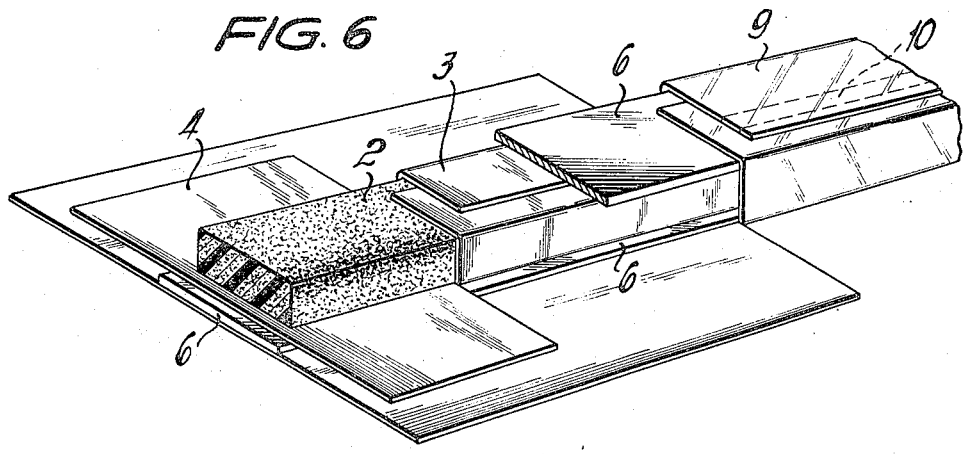

FIG. 6 illustrates a similar but different embodiment than FIG. 5, in which the rigid plates 6 are formed with the help of a synthetic foil 9 into a tube-like body which is then secured together at 10 by plastic soldering.

Figure 7:
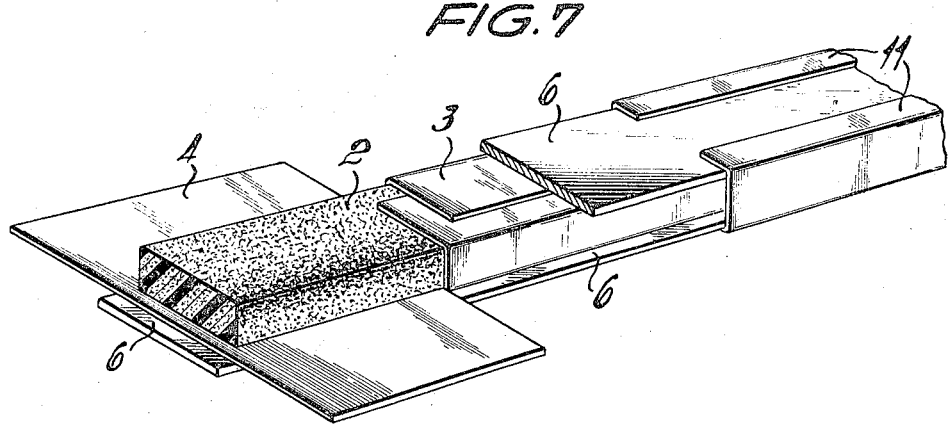

With reference to FIG. 7 which illustrates an embodiment of the present invention similar to the one in FIG. 5, however, in some variations, and wherein the rigid plates 6 are formed into a tube-like material by being glued together by strips 11.

FIG. 8 illustrates an integral tube 12 which is made from a hardened synthetic material and having a rectangular cross-section and into which through its aperture 13 the foam strip material 2 wrapped with the silicon paper 3 is shoved in.

FIG. 9 illustrates a tube 15 made from a hardened synthetic material and having a large cross-section capable of receiving two compressed foam strip materials 2 wrapped into silicon paper 3 each with a non-sticking insert 14 therebetween for separating the two strips and are capable of being slid out from the tube 15 together or separate.

With reference to FIG. 10, it is seen that a tube 16 has six compartments 17 and is made as an integral tube from a rigid and solidified synthetic material by injection methods, or by having several individual tubes 12 glued together. Each compartment 17 is adapted to receive a foam strip material 2 wrapped into the silicon paper 3.

I wish it to be understood that I do not desire to be limited to the exact details of construction shown and described, for obvious modifications will occur to a person skilled in the art.

Having thus described the invention, what I claim as new and desire to be secured by Letter Patent is as follows:

1. A foam strip sealing material impregnated with an adhesive means having long lasting plastic properties capable of retention of the foam strip material in a compressed state prior to its use, in combination with a wrapping means removably surrounding said compressed foam strip material, said wrapping means comprising a first layer of silicon paper having a silicon coating on both of its sides, a rigid outer cover means of non-sticking synthetic material into which the foam strip with the silicon paper thereon is slidably and removably inserted.

2. The combination as claimed in claim 1, wherein said foam strip material is compressed to a rectangular cross-section, a pair of rigid thin plate means being placed on two sides of said strip material and a further means surrounding said strip material and said pair of rigid thin plate means for forming said outer rigid cover means as a tube-like cover means.

3. The combination as claimed in claim 2, wherein the cross-section of said outer rigid means is corresponding to the cross-section of the compressed foam strip material.

4. The combination as claimed in claim 2, wherein said further means is adhesive means and comprises paper secured together by gluing along a seam portion.

5. The combination as claimed in claim 2, wherein said further means is a synthetic foil and is placed about said rigid plate means for forming said outer rigid cover means therewith in the form of a tube-like body, said synthetic foil being soldered together along a seam portion.

6. The combination as claimed in claim 2, wherein said further means is an adhesive foil and is placed onto said pair of plate means for forming said outer rigid means in the form of a tube-like body.

7. The combination as claimed in claim 2, wherein said further means is an adhesive strip and is placed over said rigid plate means along the smaller side of said foam strip material for forming said outer rigid means in the form of a tube-like body.

8. The combination as claimed in claim 1, wherein said outer rigid means comprises a tube of closed construction and having thin walls, said tube being of a synthetic material and having a rectangular cross-section, said foam material with the silicon paper thereon can be slid in and out of said tube.

9. The combination as claimed in claim 1, wherein said outer rigid means comprises a tube-like body capable of receiving therein at least a pair of said foam strip material in said silicon paper.

10. The combination as claimed in claim 1, wherein said silicon paper extends beyond an end portion of said foam material for serving as a gripping portion for enabling pulling out of said foam material from said outer rigid means and for stripping said paper.

References Cited

UNITED STATES PATENTS

| | | | |
|---|---|---|---|
| 2,613,862 | 10/1952 | Vaughn | 226—2 |
| 3,521,742 | 7/1970 | Ferrell | 206—46 |

FOREIGN PATENTS

| | | |
|---|---|---|
| 1,108,995 | 4/1968 | Great Britain. |

WILLIAM J. VAN BALEN, Primary Examiner

US. Cl. X.R.

206—46; 161—139, 161